US011908432B2

(12) United States Patent
Koo et al.

(10) Patent No.: US 11,908,432 B2
(45) Date of Patent: Feb. 20, 2024

(54) APPARATUS AND METHOD FOR AUTOMATICALLY CONTROLLING SCREEN BRIGHTNESS OF AVN SYSTEM

(71) Applicants: Hyundai Motor Company, Seoul (KR); Kia Corporation, Seoul (KR)

(72) Inventors: Hyun Woo Koo, Seoul (KR); Mun Jun Hur, Yongin-Si (KR); Tae Ho Lee, Seoul (KR); Hyeo Jin Kim, Seoul (KR); Kwang Seung Heo, Seoul (KR); Kyowoong Choo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 56 days.

(21) Appl. No.: 17/521,555

(22) Filed: Nov. 8, 2021

(65) Prior Publication Data

US 2022/0223119 A1 Jul. 14, 2022

(30) Foreign Application Priority Data

Jan. 5, 2021 (KR) ........................ 10-2021-0000907

(51) Int. Cl.
*G09G 5/10* (2006.01)

(52) U.S. Cl.
CPC ........... *G09G 5/10* (2013.01); *G09G 2354/00* (2013.01); *G09G 2360/144* (2013.01); *G09G 2360/16* (2013.01); *G09G 2380/10* (2013.01)

(58) Field of Classification Search
CPC ................. G09G 5/10; G09G 2354/00; G09G 2360/144; G09G 2360/16; G09G 2380/10;

(Continued)

(56) References Cited

U.S. PATENT DOCUMENTS 5,406,305 A * 4/1995 Shimomura ............. G09G 5/10 345/63
5,554,912 A * 9/1996 Thayer ..................... B60Q 3/85 315/157

(Continued)

FOREIGN PATENT DOCUMENTS

KR 10-2022-0089524 A 6/2022

OTHER PUBLICATIONS

Mass Production Applying Verification; Jul. 2020 Navigation Update.

*Primary Examiner* — Rodney Amadiz
(74) *Attorney, Agent, or Firm* — MORGAN, LEWIS & BOCKIUS LLP

(57) ABSTRACT

An apparatus and a method for automatically controlling a screen brightness of an AVN system are provided to automatically change screen brightness in a user customized manner in a response to a change in illumination outside the vehicle. The apparatus include a screen brightness control module that controls such that a screen brightness of a display provided in the AVN system is automatically changed according to a change in the illumination data received from the illumination sensor, based on a default matching relationship between previously stored illumination data and screen brightness and a gain adjustment module that generates a new customized matching relationship by correcting the screen brightness matched to each illumination data based on the default matching relationship in accordance with an input of a user who adjusts to enhance or weaken the screen brightness and provides the screen brightness control module with the new customized matching relationship for screen brightness control.

17 Claims, 10 Drawing Sheets

(58) Field of Classification Search
CPC ... G09G 2320/0233; G09G 2320/0626; G09G 3/36
See application file for complete search history.

(56) References Cited

U.S. PATENT DOCUMENTS

| | | | | |
|---|---|---|---|---|
| 8,169,450 | B2 * | 5/2012 | Santo | H05B 47/11 345/690 |
| 9,424,804 | B2 * | 8/2016 | Jung | G09G 5/10 |
| 2006/0239017 | A1 * | 10/2006 | Woo | B60Q 3/16 362/459 |
| 2006/0256067 | A1 * | 11/2006 | Montero | G09G 3/3406 345/102 |
| 2007/0055955 | A1 * | 3/2007 | Lee | G09G 5/363 717/113 |
| 2008/0291139 | A1 * | 11/2008 | Hsieh | G09G 5/00 345/77 |
| 2009/0192704 | A1 | 7/2009 | Geelen | |
| 2012/0068981 | A1 * | 3/2012 | Pantfoerder | G09G 3/2003 345/207 |
| 2014/0092119 | A1 | 4/2014 | Jung et al. | |
| 2015/0070337 | A1 * | 3/2015 | Bell | G09G 3/2003 345/82 |
| 2017/0116963 | A1 * | 4/2017 | Wanat | G06T 5/009 |
| 2018/0053488 | A1 * | 2/2018 | Hunter | A45F 5/00 |
| 2018/0190240 | A1 * | 7/2018 | Ropo | G09G 3/20 |
| 2019/0304402 | A1 | 10/2019 | Suzuki et al. | |
| 2020/0164801 | A1 * | 5/2020 | Takenaka | B60R 11/04 |
| 2021/0016793 | A1 | 1/2021 | Yamaguchi et al. | |
| 2022/0198978 | A1 | 6/2022 | Koo et al. | |

* cited by examiner

APPARATUS AND METHOD FOR AUTOMATICALLY CONTROLLING SCREEN BRIGHTNESS OF AVN SYSTEM

CROSS-REFERENCE TO RELATED APPLICATION

The present application claims priority to Korean Patent Application No. 10-2021-0000907, filed on Jan. 5, 2021, the entire contents of which is incorporated herein for all purposes by this reference.

BACKGROUND OF THE INVENTION

Field of the Invention

The present invention relates to an apparatus and a method for automatically controlling a screen brightness of an audio video navigation (AVN) system to automatically adjust a brightness of a screen depending on a change in illumination outside a vehicle.

Description of Related Art

In general, an AVN system provided in a vehicle outputs content at fixed brightness, which is preset on a setting menu by a user, on a screen.

Thus, a brightness of the screen on which content is output in a conventional AVN system is kept constant using a predetermined value, irrespective of a change in external illumination according to a change in external environment where the vehicle is traveling.

In other words, although illumination is changed according to presence or absence of a nearby light source during a change in weather or during night driving, because a screen brightness of the AVN system is maintained as a fixed value, it is difficult to avoid that visibility of content displayed on the screen is degraded.

Furthermore, although a driving environment is rapidly changed while accompanying a change in external illumination, for example, while the vehicle travels, when the vehicle enters a dark place such as a tunnel or an underground parking lot or when the vehicle enters a bright place, because a screen brightness of the AVN system is maintained as a fixed value, it is difficult to avoid that visibility of the displayed content is degraded.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for automatically controlling a screen brightness of an AVN system may include a screen brightness control module that controls such that a screen brightness of a display provided in the AVN system is automatically changed according to a change in illumination data received from an illumination sensor, based on a default matching relationship between previously stored illumination data and screen brightness and a gain adjustment module that generates a new customized matching relationship by correcting the screen brightness matched to each illumination data based on the default matching relationship in accordance with an input of a user who adjusts to enhance or weaken the screen brightness and provides the screen brightness control module with the new customized matching relationship for screen brightness control, to automatically change screen brightness in a user customized manner in a response to a change in illumination outside the vehicle to enhance visibility of visual content.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of automatically controlling a screen brightness of an AVN system may include an illumination sensor that measures illumination outside a vehicle per certain period, a screen brightness control module that controls such that a screen brightness of a display provided in the AVN system is automatically changed according to a change in the illumination data received from the illumination sensor, based on a default matching relationship between previously stored illumination data and screen brightness, and a gain adjustment module that generates a new customized matching relationship by correcting the screen brightness matched to each illumination data based on the default matching relationship in accordance with an input of a user who adjusts to enhance or weaken the screen brightness and provides the screen brightness control module with the new customized matching relationship for screen brightness control.

In the instant case, the screen brightness control module may include an illumination data receiving device that receives the illumination data transmitted per a predetermined period from the illumination sensor and determines an average of a certain number of received illumination data and a per-illumination brightness controller that determines target screen brightness matched to the average of the illumination data, the average being determined by the illumination data receiving device, from a previously stored default matching relationship and controls such that a current screen brightness of the display provided in the AVN system changes to the target screen brightness.

Furthermore, the gain adjustment module may determine a ratio of the screen brightness corrected by the input of the user to screen brightness on the default matching relationship, the screen brightness being matched to current illumination data, as a user adjustment gain which is a screen brightness change degree the user requires to correct.

Furthermore, the gain adjustment module may multiply screen brightness on a default graph illustrating the default matching relationship between the illumination data and the screen brightness by the user adjustment gain to generate a new customized graph illustrating a customized matching relationship re-generated by adjustment of the user.

Furthermore, the apparatus may further include a dimming control module that performs dimming control so that screen brightness is changed on a stage-by-stage basis by a predetermined ratio per a predetermined period, in automatically changing, by the screen brightness control module, a screen brightness degree depending on the change in the illumination data using the default matching relationship or a customized matching relationship.

Furthermore, the dimming control module may include a dimming adjusting device that determines a dimming period and a dimming ratio of screen brightness which may change on a stage-by-stage basis until reaching target screen brightness to be implemented from current illumination data and a dimming executing device that controls to change current screen brightness by a predetermined dimming ratio per the dimming period determined by the dimming adjusting device.

Furthermore, the dimming adjusting device may include a dimming period determining device that determines a default dimming period for changing the screen brightness from the current screen brightness to the target screen brightness and a dimming ratio determining device that determines a default dimming ratio which is a change degree of screen brightness to be changed for each default dimming period.

Furthermore, the dimming control module may further include a dimming varying device that determines a variable dimming period and a variable dimming ratio by changing the default dimming period and the default dimming ratio based on a driving speed of the vehicle such that dimming control by the variable dimming period and the variable dimming ratio is executable by the dimming executing device.

Furthermore, the dimming varying device may include a vehicle speed receiving device that obtains a vehicle speed which is traveling, a dimming period varying device that determines the variable dimming period by shortening the default dimming period based on the vehicle speed, when the vehicle speed is faster than a predetermined default speed, and a dimming ratio varying device that determines the variable dimming ratio by changing the default dimming ratio based on a ratio of the vehicle speed to the predetermined default speed.

Furthermore, the dimming period varying device may multiply the default dimming period by a ratio of the predetermined default speed to the vehicle speed to determine the variable dimming period by shortening the default dimming period, when the vehicle speed is faster than the predetermined default speed.

Furthermore, the dimming ratio varying device may multiply the default dimming period by a ratio of the predetermined default speed to the vehicle speed to determine the variable dimming period by increasing or decreasing the default dimming period.

According to various aspects of the present invention, a method for automatically controlling a screen brightness of an AVN system may include receiving at least one illumination data measured per a predetermined period by an illumination sensor, controlling so that a screen brightness of a display provided in the AVN system is automatically changed according to a change in the illumination data received from the illumination sensor, based on a default matching relationship between the illumination data and screen brightness, and generating a new customized matching relationship by correcting the screen brightness matched to each illumination data based on the default matching relationship in accordance with an input of a user who adjusts to enhance or weaken the screen brightness and providing the new customized matching relationship for screen brightness control.

In the instant case, the controlling may include finding a value corresponding to illumination data from an illumination-brightness table which stores the default matching relationship between the illumination data and the screen brightness, determining screen brightness matched to the illumination data as target screen brightness in a current illumination environment, and controlling so that the brightness is implemented.

Furthermore, the providing of the new customized matching relationship may include determining a ratio of the screen brightness corrected by the input of the user to screen brightness on the default matching relationship, the screen brightness being matched to current illumination data, as a user adjustment gain which is a screen brightness change degree the user requires to correct, multiplying the screen brightness on the default matching relationship by the user adjustment gain to determine new screen brightness, and generating a customized matching relationship by matching the new screen brightness to each illumination data.

Furthermore, the method may further include performing dimming control so that screen brightness is changed on a stage-by-stage basis by a predetermined ratio per a predetermined period, in automatically changing a screen brightness degree depending on the change in the illumination data using the default matching relationship or a customized matching relationship.

Furthermore, the method may further include determining a dimming period and a dimming ratio of screen brightness which should change on a stage-by-stage basis until reaching target screen brightness on the default matching relationship or the customized matching relationship to be implemented by current illumination data, before performing the dimming control.

Furthermore, the determining of the dimming period and the dimming ratio may include determining a default dimming period for changing the screen brightness on a stage-by-stage basis from current screen brightness to the target screen brightness and determining a default dimming ratio which is a change degree of screen brightness to be changed for each default dimming period.

Furthermore, the method may further include determining a variable dimming period and a variable dimming ratio by changing the default dimming period and the default dimming ratio based on a driving speed of a vehicle and providing the variable dimming period and the variable dimming ratio for the dimming control.

Furthermore, the providing of the variable dimming period and the variable dimming ratio may include obtaining a vehicle speed which is traveling, determining the variable dimming period by shortening the default dimming period based on the vehicle speed, when the vehicle speed is faster than a predetermined default speed, and determining the variable dimming ratio by changing the default dimming ratio based on a ratio of the vehicle speed to the predetermined default speed.

Furthermore, the determining of the variable dimming period may include multiplying the default dimming period by a ratio of the predetermined default speed to the vehicle speed to determine the variable dimming period by shortening the default dimming period, when the vehicle speed is faster than the predetermined default speed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
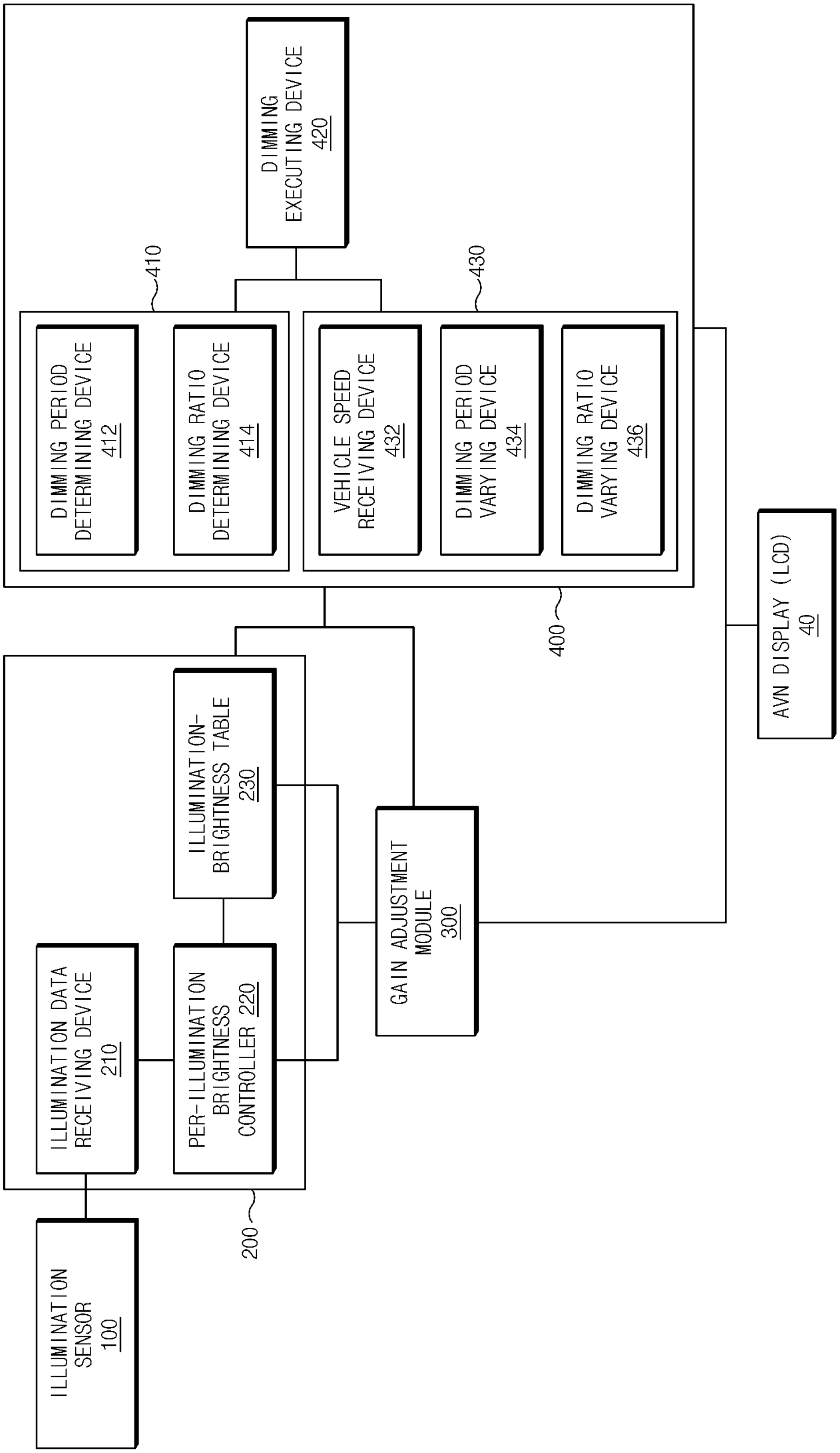
FIG. 1 is a block diagram illustrating a configuration of an apparatus of automatically controlling a screen brightness of an AVN system according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, “A”, “B”, (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 10.

Figure 2:
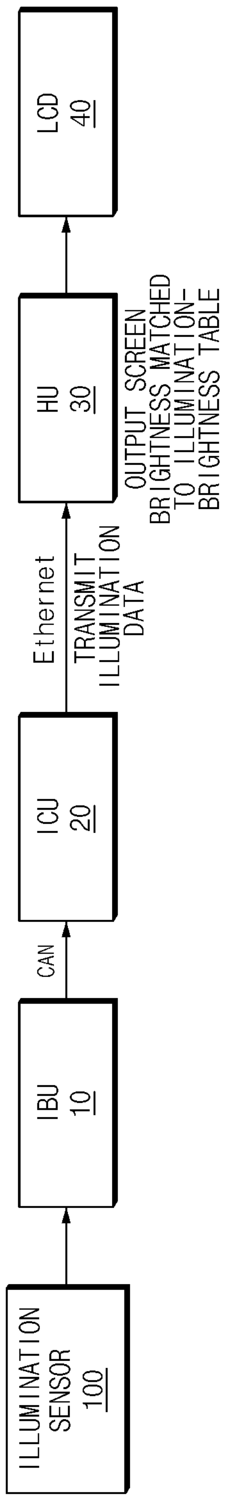
FIG. 2 is a block diagram illustrating that illumination data is transmitted to a head unit (HU) to be used to control screen brightness according to various exemplary embodiments of the present invention.
Figure 3:
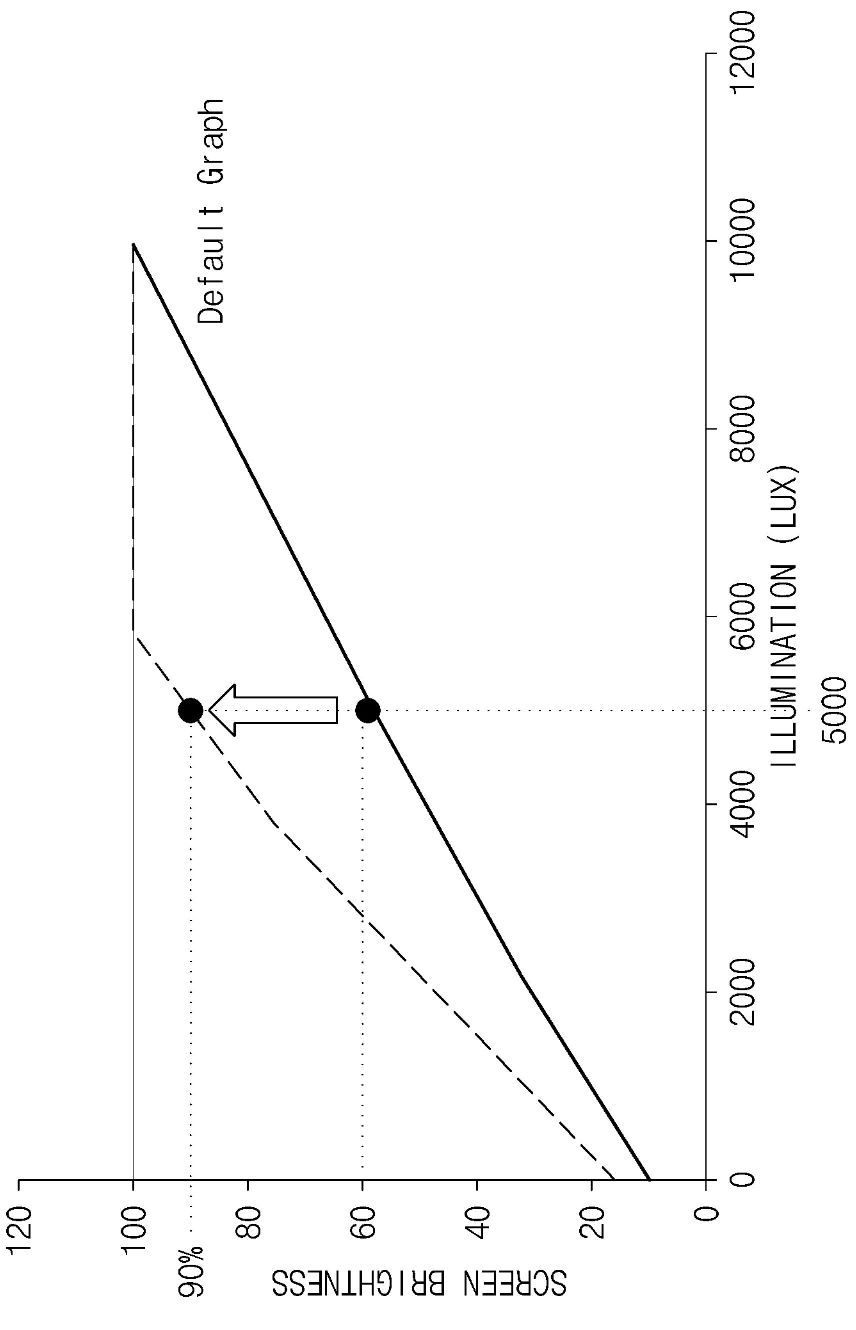
FIG. 3 is an exemplary graph illustrating that a customized graph is generated based on a default graph by manipulation of a user according to various exemplary embodiments of the present invention.
Figure 4:
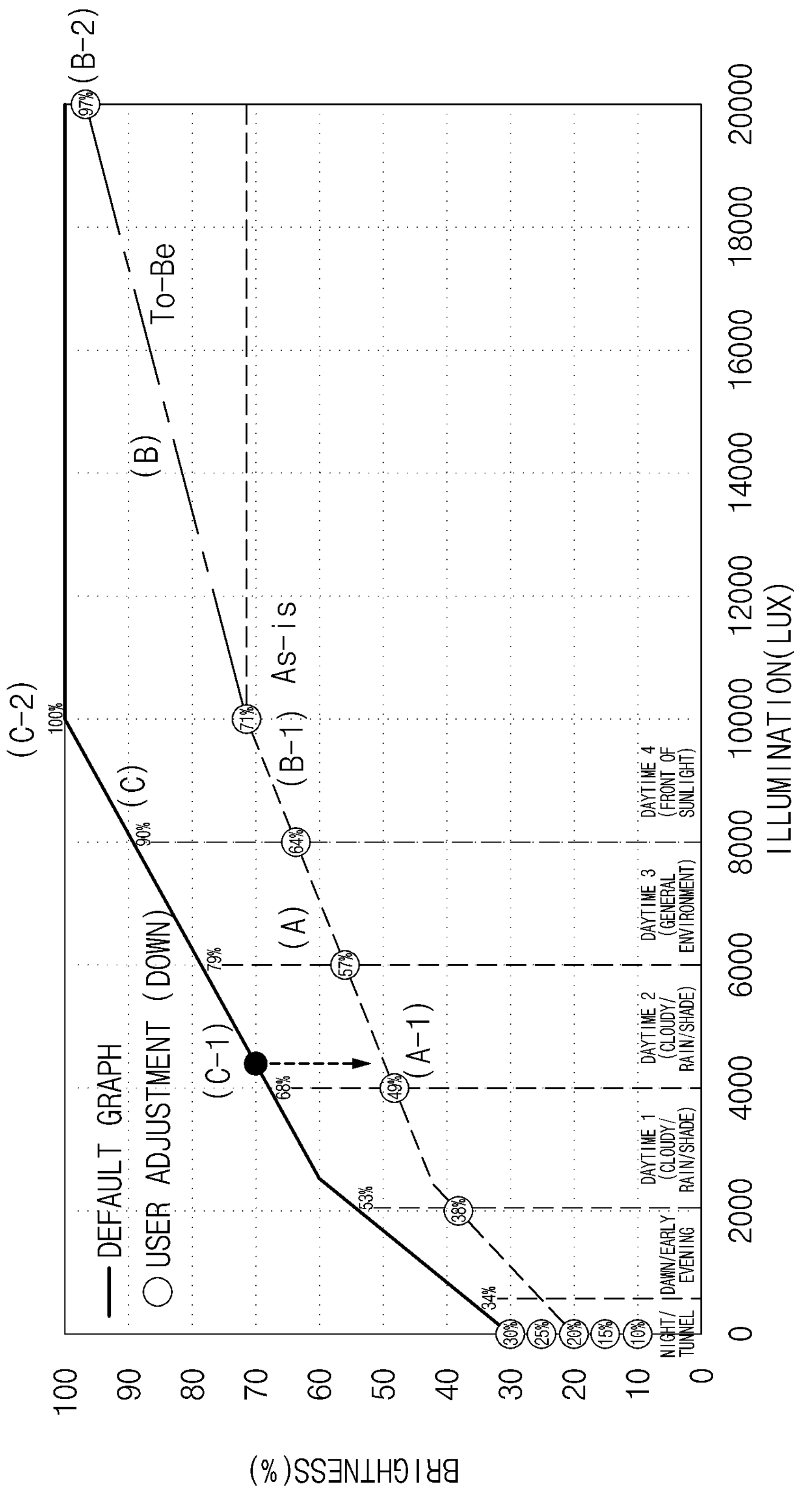
FIG. 4 is a customized graph illustrating an example of a customized matching relationship generated when illumination data is less than or equal to 10,000 Lux according to various exemplary embodiments of the present invention.
Figure 5:
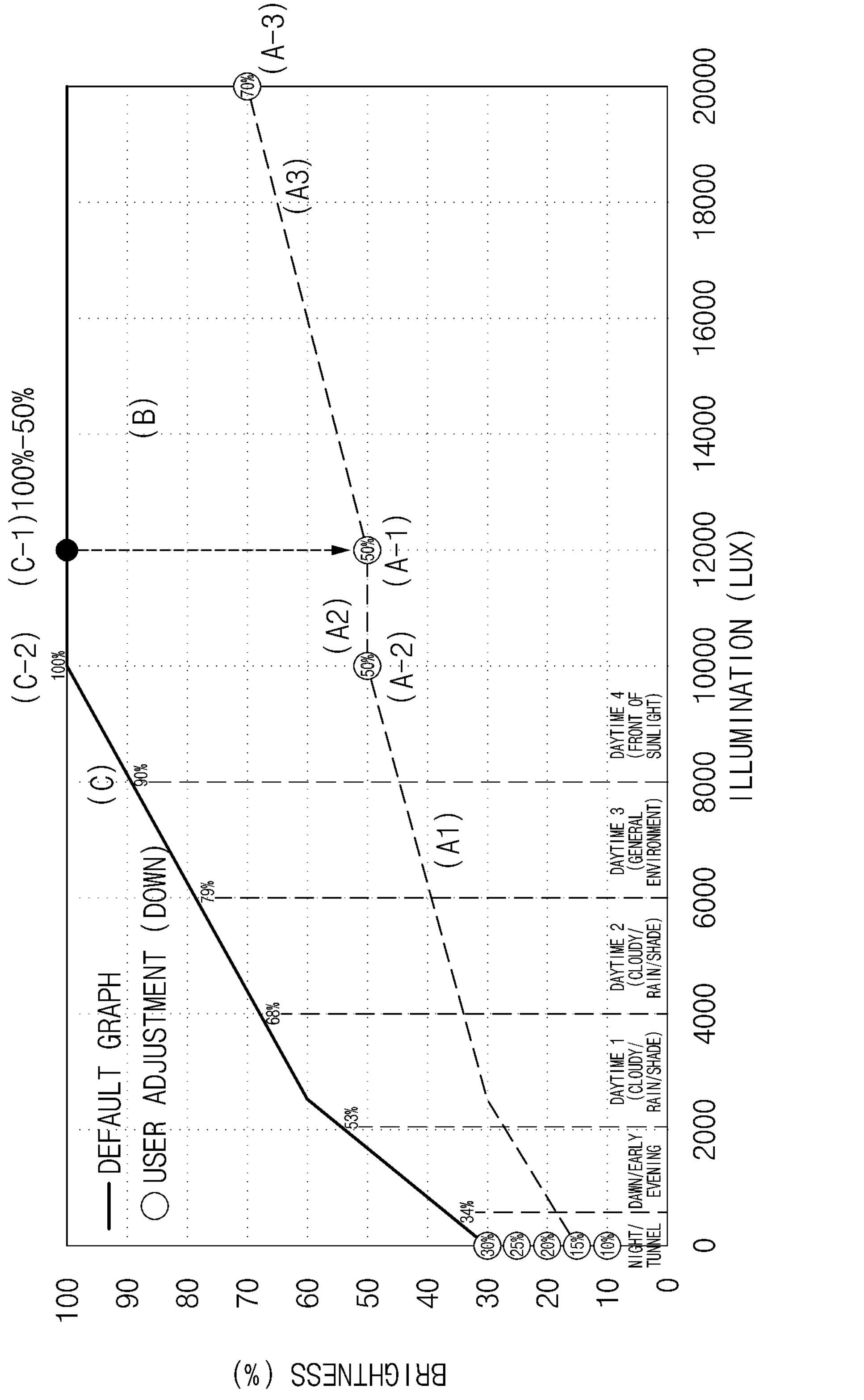
FIG. 5 is a customized graph illustrating an example of a customized matching relationship generated when illumination data is greater than or equal to 10,000 Lux according to various exemplary embodiments of the present invention.
Figure 6:
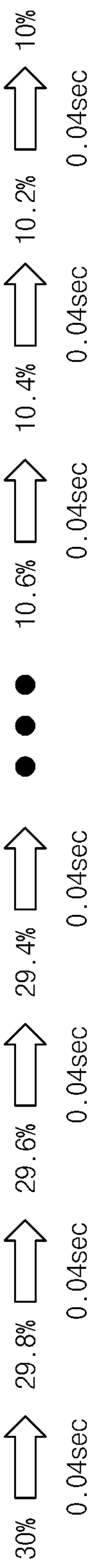
FIG. 6 is a drawing illustrating a dimming process where a screen brightness of a display provided in an AVN system is changed according to various exemplary embodiments of the present invention.

FIG. 1 is a block diagram illustrating a configuration of an apparatus of automatically controlling a screen brightness of an AVN system according to various exemplary embodiments of the present invention. FIG. 2 is a block diagram illustrating that illumination data is transmitted to a head unit (HU) to be used to control screen brightness according to various exemplary embodiments of the present invention. FIG. 3 is an exemplary graph illustrating that a customized graph is generated based on a default graph by manipulation of a user according to various exemplary embodiments of the present invention. FIG. 4 is a customized graph illustrating an example of a customized matching relationship generated when illumination data is less than or equal to 10,000 Lux according to various exemplary embodiments of the present invention. FIG. 5 is a customized graph illustrating an example of a customized matching relationship generated when illumination data is greater than or equal to 10,000 Lux according to various exemplary embodiments of the present invention. FIG. 6 is a drawing illustrating a dimming process where a screen brightness of a display provided in an AVN system is changed according to various exemplary embodiments of the present invention.

Referring to FIG. 1, the apparatus of automatically controlling the screen brightness of the AVN system according to various exemplary embodiments of the present invention may include an illumination sensor 100 for measuring illumination outside a vehicle per certain period to obtain illumination data, a screen brightness control module 200 for controlling such that a screen brightness of a display 40 provided in the AVN system is automatically changed according to a change in the illumination data received from the illumination sensor 100 based on a default matching relationship between previously stored illumination data and screen brightness, and a gain adjustment module 300 for generating a new customized matching relationship by correcting screen brightness matched to each illumination data based on the default matching relationship depending on an input of a user who adjusts to enhance or weaken screen brightness and providing the screen brightness control module 200 with the new customized matching relationship for screen brightness control.

The illumination sensor 100 may measure illumination outside the vehicle per certain period to obtain illumination data and may transmit the illumination data to the screen brightness control module 200.

Accordingly, the screen brightness control module 200 may quantitatively identify a change in illumination outside the vehicle which is traveling depending on the illumination data transmitted from the illumination sensor 100 to obtain illumination environment information for controlling a screen brightness of the display 40 provided in the AVN system.

Furthermore, the screen brightness control module 200 may include an illumination data receiving device 210 for receiving the illumination data transmitted per certain period from the illumination sensor 100 and determining an average of a certain number of received illumination data and a per-illumination brightness controller 220 for determining target screen brightness matched to the average of the illumination data determined by the illumination data receiving device 210 from a previously stored default matching relationship and controlling such that a current screen brightness of the display 40 provided in the AVN system is changed to the target screen brightness.

In the instant case, the illumination data receiving device 210 may directly receive the illumination data using an inter-vehicle communication network connected to the illumination sensor 100, and as shown in FIG. 2, may receive the illumination data sequentially through respective controllers previously constructed in the vehicle.

In FIG. 2, as an example of receiving the illumination data via the respective controllers previously constructed, the illumination data measured by the illumination sensor 100 may be transmitted to an integrated body unit (IBU) 10 and may pass through an integrated central control unit (ICU) 20 through controller area network (CAN) communication from the IBU 10 to be provided to a head unit (HU) 30 through Ethernet communication, thus being used to control a screen brightness of the LCD 40 which is the display of the AVN system.

In the instant case, it is obvious that the path where the illumination data is transmitted via at least one controller from the illumination sensor 100 is not limited to the contents of the example shown in FIG. 2.

Furthermore, the illumination data receiving device 210 may determine an average of a plurality of illumination data repeatedly measured per certain period (e.g., 40 ms) by the illumination sensor 100 and may output the determined average as final illumination data for changing a screen brightness of the display 40 provided in the AVN system. Thus, the illumination data receiving device 210 may prevent the screen brightness from being unnecessarily changed by a temporary illumination change when the vehicle is traveling.

In other words, the illumination data receiving device 210 may continue receiving illumination data per certain period when the vehicle is traveling and may determine the average of the received illumination data. The per-illumination brightness controller 220 may compare the average illumination data with previously determined average illumination data to recognize an illumination change of an environment outside the vehicle.

Furthermore, the per-illumination brightness controller 220 may find a value corresponding to the illumination data from a previously constructed default matching relationship and may determine screen brightness matched to the illumination data as target screen brightness to be applied to improve visibility of visual content in a current illumination environment, thus controlling to change a screen brightness of the display 40 provided in the AVN system.

To the present end, the screen brightness control module 200 may further include an illumination-brightness table 230 for previously obtaining screen brightness configured for ensuring visibility of visual content displayed on the display 40 of the AVN system under an environment where each illumination data is measured and storing a default matching relationship of matching the screen brightness to each illumination data.

Accordingly, by previously constructing and storing the illumination-brightness table 230 of matching a screen brightness degree to each illumination data, the per-illumination brightness controller 220 may determine screen brightness matched to the illumination data by only finding the value of the illumination data determined by the illumination data receiving device 210 from the illumination-brightness table 230.

FIG. 3 illustrates a default graph of a solid line where the screen brightness increases from 0 Lux to 10,000 Lux in the illumination-brightness table 230. The default graph shown in FIG. 3 illustrates that it is able to continuously set the screen brightness according to the illumination data. It is obvious that the screen brightness may be stored in a form of a table of matching specific screen brightness to specific illumination data, rather than the graph illustrating continuous values.

Accordingly, because the screen brightness degree of the display 40 provided in the AVN system is automatically changed according to the change in illumination environment outside the vehicle by the per-illumination brightness controller 220, but because the screen brightness automatically controlled by the illumination-brightness table 230 is the result of being empirically determined by experimental values, a desired brightness degree may vary for each user.

Thus, there is a need to control to automatically change screen brightness depending on a change in illumination data and display a brighter screen or a darker screen than screen brightness on the default matching relationship matched on the illumination-brightness table 230 in the same illumination data.

To the present end, the gain adjustment module 300 may re-generate the screen brightness matched to the illumination data as a customized matching relationship between the illumination data and new screen brightness depending on information input by each user.

In other words, when the user enhances or weakens current screen brightness on the default matching relationship indicating current illumination data and screen brightness matched to the current illumination data, the gain adjustment module 300 may reflect a user adjustment gain, which is a degree to which screen brightness is changed by the input of the user, in screen brightness on the default matching relationship stored in the illumination-brightness table 230 to re-generate the user adjustment gain as a customized table (or a customized graph) indicating a customized matching relationship between illumination data and new screen brightness.

Thus, because a brightness change according to a subsequent change in illumination data is able to be controlled by the re-generated customized matching relationship, control of screen brightness may be performed in a customized manner specialized in each user.

A description will be provided of an example of generating, by the gain adjustment module 300, a customized graph illustrating a customized matching relationship based on a default graph illustrating a default matching relationship with reference to FIG. 3. In FIG. 3, a default graph where screen brightness between from 10 Lux to 10,000 Lux changes from about 10% to 100% is shown with a solid line.

When the user adjusts screen brightness in a current illumination environment of 5,000 Lux to be enhanced from 60% to 90% (when the adjustment direction of the user is displayed with an arrow in FIG. 3), a user adjustment gain for adjusting a default matching relationship between illumination and screen brightness on the default graph may be determined as Equation 1 below.

$$\text{User adjustment gain} = \frac{\text{Screen brightness corrected by input of user}}{\text{Screen brightness on default matching relationship}} \quad \text{[Equation 1]}$$

In Equation 1 above, when screen brightness corrected by a current user input is 90% and when screen brightness on the default matching relationship, which is matched to current illumination, is 60%, the user adjustment gain may be determined as 1.5.

Thereafter, the gain adjustment module 300 may multiply screen brightness on the default graph illustrating the default matching relationship between the illumination and the brightness by the user adjustment gain to generate a new customized graph illustrating the customized matching relationship re-generated by the adjustment of the user. In FIG. 3, the customized graph illustrating the re-generated customized matching relationship is shown with a dotted line.

Accordingly, the per-illumination brightness controller 220 may control to change screen brightness based on the customized matching relationship to ensure visibility of visual content displayed on the display 40 of the AVN system upon a sharp illumination change generated when the vehicle is traveling and maintain a state of screen brightness each user wants in a customized manner.

Furthermore, as another example of the customized graph illustrating the customized matching relationship between illumination specialized in each user and screen brightness, a customized graph when screen brightness decreases in an illumination environment where illumination data is less than or equal to 10,000 Lux is shown in FIG. 4 and a customized graph when screen brightness decreases in an illumination environment where illumination data is greater than or equal to 10,000 Lux is shown in FIG. 5.

In the instant case, in FIGS. 4 and 5, illumination data under an environment most users will encounter when vehicles are traveling are separately shown in "night/tunnel", "dawn/early evening", "daytime 1 (cloudy/rain/shade) ", "daytime 2 (cloudy/rain/shade)", "daytime 3 (general environment)", and "daytime 4 (front of sunlight)". It is obvious that such classification is only an example of approximately and separately showing that illumination data may vary with various driving environments and is not limited to a value of illumination data dividing respective situations or a value indicating screen brightness matched to the value of the illumination data.

First of all, FIG. 4 illustrating a relationship between illumination and screen brightness when illumination data is less than or equal to 10,000 Lux illustrates that a customized graph (displayed with straight line A) represented with a dotted line is generated by down adjustment of the user based on a default graph (displayed with straight line C) represented with a solid line.

When the down adjustment of the user is input, by use of screen brightness (50%) (point A−1) corrected by the current user input using Equation 1 above and screen brightness (70%) (point C−1) on the default graph matched to current illumination, the gain adjustment module 300 may determine a user adjustment gain (=50/70). The gain adjustment module 300 may multiply the default graph (straight line C) by the user adjustment gain to generate the customized graph (straight line A).

Thus, as shown in FIG. 4, as portions where screen brightness are 53%, 68%, 79%, 90%, and 100% on the default graph (straight line C) are changed to portions where screen brightness are 38%, 49%, 57%, 64%, and 71% on the customized graph (straight line A) and as the other portions on the default graph to the other portions on the customized graph, control of screen brightness according to an illumination change is performed by a newly generated customized graph.

In the instant case, because the screen brightness arrives at 100% at 10,000 Lux on the default graph (straight line C), it may be verified that there is no change in screen brightness although illumination subsequently increases, but the screen brightness is 71% at 10,000 Lux on the customized graph.

Thus, the value itself determined by multiplying the default graph by the user adjustment gain may be determined like the customized graph of the dotted line ("As-is portion" of straight line A). However, because there is substantially room for a brighter screen depending on an increase in illumination data, the gain adjustment module 300 may generate an additional customized graph (straight line B) illustrating with an alternate long and short dash line with respect to an illumination change over 10,000 Lux.

To determine the additional customized graph, the gain adjustment module 300 may determine ((B−1)=(C−2) *Gain=100*50/70) screen brightness indicated at the point (point B−1) of the customized graph by the point (point C−2) where screen brightness arrives at 100% on the default graph.

The gain adjustment module 300 may generate the additional customized graph (straight line B) shown in FIG. 4 by setting screen brightness to increase by a certain ratio (e.g., 0.05%) whenever illumination data increases by a certain degree (e.g., 20 Lux (=1 Dec)) from screen brightness at point B−1. Thus, the gain adjustment module 300 may further generate an additional change graph where screen brightness increases in proportion to an increase in illumination data under an environment in which illumination data of 10,000 Lux or more is generated.

Furthermore, it is obvious that screen brightness may change to 30%, 25%, 20%, 15%, and 10% depending on a change in illumination data as shown in FIG. 4 in a low illumination environment of 400 Lux or less.

First of all, FIG. 5 illustrating a relationship between illumination and screen brightness when illumination data is greater than or equal to 10,000 Lux illustrates that a customized graph (displayed with straight line A1) represented with a dotted line is generated by down adjustment of the user based on a default graph (displayed with straight line C) represented with a solid line.

FIG. 5 illustrates that a customized graph is generated by a gain determined in a response to down adjustment of the user, when the user performs down adjustment of screen brightness while the screen brightness is kept 100% (point C−1) in an environment where illumination data is greater than or equal to 10,000 Lux.

In the instant case, point C−1 on a default graph (straight line C) indicates a start point where the user changes screen brightness, and point A−1 on a customized graph (straight line A1) corresponding to C−1 point indicates an end point where brightness is changed by adjustment of the user. FIG. 5 illustrates a point, screen brightness of which is changed, using an arrow of a dotted line connected from point C−1 to point A−1.

To generate a customized graph in an environment which is greater than or equal to 10,000 Lux, as shown in FIG. 5, the gain adjustment module 300 may determine a gain (=50/100) for decreasing screen brightness of an end point corresponding to a start point where the user changes screen brightness to 50% and may multiply the default graph (straight line C) by the determined gain to generate the customized graph (straight line A1).

Furthermore, point A-2 corresponding to point C-2 point where screen brightness starts to be 100% on the default graph becomes a point where screen brightness starts to be 50% on the customized graph. Thus, the gain adjustment module 300 may generate straight line A2, where screen brightness at point A-2 is maintained, from point A-2 to point A-1 where down adjustment of the user is input.

The gain adjustment module 300 may set screen brightness to increase by a certain ratio (e.g., 0.05%) whenever illumination data increases by a certain degree (e.g., 20 Lux (=1 Dec)) after point A-1 to generate a customized graph where screen brightness increases in proportion to an increase in illumination data at 10,000 Lux or more like straight line A3 shown in FIG. 5.

Furthermore, the apparatus of automatically controlling the screen brightness of the AVN system may further include a dimming control module 400 for controlling such that screen brightness is changed on a stage-by-stage basis by a certain ratio such that the screen brightness naturally changes without causing a sense of difference to the vision of the user who is driving the vehicle, in automatically changing, by the screen brightness control module 200, a screen brightness degree depending on the change in the illumination data using the default matching relationship or the customized matching relationship.

To the present end, the dimming control module 400 may include a dimming adjusting device 410 for determining a dimming period and a dimming ratio of screen brightness which should be changed on a stage-by-stage basis until arriving at the target screen brightness on the default matching relationship or the customized matching relationship to be implemented from current illumination data and a dimming executing device 420 for controlling to change current screen brightness by a certain dimming ratio per dimming period determined by the dimming adjusting device 410.

In the instant case, the dimming period determined by the dimming adjusting device 410 indicates a change period when an increase or decrease in screen brightness is performed to reach the target screen brightness, and the dimming ratio indicates a change ratio of screen brightness which increases or decreases in one dimming period.

Furthermore, the dimming control module 400 may execute dimming control when there is a change in screen brightness on all illumination data regions and may control such that screen brightness changes on a stage-by-stage basis. However, as seen in the default graph and the customized graph shown in FIG. 4, in a low illumination environment where illumination data is less than or equal to 400 Lux, a change degree of screen brightness according to an illumination change is required at a higher ratio than other illumination environments, and the user more easily feels a visual sense of difference against a change in screen brightness because it is dark around the user. Thus, the dimming control module 400 may be mainly applied when there is a change in screen brightness in a low illumination environment of 400 Lux or less.

In other words, when the brightness of the display 40 provided in the AVN system should change from about 34% or less to screen brightness lower than about 34% or less or vise versa, the dimming executing device 420 may control such that screen brightness changes at a certain dimming ratio per certain dimming period to reach the target screen brightness.

Accordingly, while the dimming executing device 420 executes dimming control of increasing or decreasing screen brightness by the certain dimming ratio per certain dimming period, the screen brightness control module 200 may continue determining an average of illumination data obtained by the illumination data receiving device 210 and may correct the target screen brightness to screen brightness matched to the average value of the illumination data to control to automatically change the screen brightness. Screen brightness suitable for an illumination environment changed due to this may be rapidly displayed.

The dimming adjusting device 410 may include a dimming period determining device 412 for determining a default dimming period for changing on a stage-by-stage basis from current screen brightness to target screen brightness on the default matching relationship or the customized matching relationship depending on an illumination change and a dimming ratio determining device 414 for determining a default dimming ratio of screen brightness to be changed for each dimming period.

In the instant case, the dimming period determining device 412 may determine the default dimming period when the screen brightness is changed as 0.04 seconds, and the dimming ratio determining device 414 may determine the default dimming ratio where the screen brightness is changed in each default dimming period as 0.2%.

In other words, because the change in screen brightness naturally proceeds within a range where the user does not feed a visual sense of difference, the dimming adjusting device 410 may determine a dimming period and a dimming ratio within a range where there is a low probability that the user will recognize the change in screen brightness.

Thus, the dimming period is determined as 0.04 seconds and the dimming ratio is determined as 0.2% in the exemplary embodiment of the present invention, but they are random values experimentally selected or selected within an allowable range of the display 40 provided in the AVN system and are not limited to such specific values, which may be determined as various values configured for naturally changing screen brightness within a range where the user does not feel a visual sense of difference.

Because the dimming period and the dimming ratio determined by the dimming adjusting device 410 are able to vary with a vehicle speed and be applied to screen brightness control as will be described below, they are referred to as a default dimming period and a default dimming ratio, respectively.

The dimming executing device 420 may generate a control command to increase or decrease screen brightness as much as the dimming ratio per dimming period determined by the dimming adjusting device 410 and may change a brightness of the display 40 provided in the AVN system. In the instant case, as will be described below, when the dimming period and the dimming ratio are changed by a dimming varying device 430, the dimming executing device 420 may generate a control command corresponding to a variable dimming ratio per variable dimming period and may change screen brightness.

As an example of such a change, as shown in FIG. 6, when illumination outside the vehicle which is traveling changes from 100 Lux (i.e., 5 Dec) to 20 Lux (i.e., 1 Dec), the dimming executing device 420 may control to reduce screen brightness by a change ratio of 0.2% per change period of 0.04 seconds to change a brightness degree from current screen brightness of 30% matched to 100 Lux to screen brightness of 10% matched to the currently measured illumination data of 20 Lux.

In the instant case, for convenience of description, screen brightness will be described using a default matching relationship on the default graph shown in FIG. 4. Thus, as shown in FIG. 6, the dimming executing device 420 may change screen brightness to 29.8% obtained by decreasing current brightness of 30% by 0.2% after 0.04 seconds elapse and may change screen brightness to 29.6% obtained by decreasing 29.8% by 0.2% after 0.04 seconds elapse, thus repeating such a screen brightness change process until reaching the target screen brightness.

Furthermore, the dimming control module 400 may further include the dimming varying device 430 for determining a variable dimming period and a variable dimming ratio by changing the default dimming period and the default dimming ratio based on a driving speed of the vehicle such that dimming control by the variable dimming period and the variable dimming ratio is executable by the dimming executing device 420.

In other words, the dimming varying device 430 may variably apply a change degree of the screen brightness changed on a stage-by-stage basis by the dimming executing device 420, depending on a speed of the vehicle which is traveling and a change in illumination environment around the vehicle, thus rapidly implementing screen brightness optimized for a driving state of the vehicle.

To the present end, the dimming varying device 430 may include a vehicle speed receiving device 432 for obtaining a speed of the vehicle which is traveling, a dimming period varying device 434 for determining a variable dimming period by shortening the default dimming period based on the vehicle speed, when the vehicle speed is faster than a default speed, and a dimming ratio varying device 436 for determining a variable dimming ratio by changing the default dimming ratio based on a ratio of the vehicle speed to the predetermined default speed.

In the instant case, the vehicle speed receiving device 432 may receive a vehicle speed from various measurement means including a wheel speed sensor provided in the vehicle.

In other words, because the shorter the vehicle speed, the longer distance the vehicle moves during a shorter time, a change in illumination environment is rapidly generated during a shorter time. Thus, the vehicle speed receiving device 432 may receive a vehicle speed to suitably change the default dimming period and the default dimming ratio.

Furthermore, the dimming period varying device 434 may compare the vehicle speed with the predetermined default speed and may multiply the default dimming period by a ratio of the predetermined default speed to the vehicle speed to determine a variable dimming period like Equation 2 below.

$$\text{Variable dimming period} = \text{Default dimming period} \times \frac{\text{Default speed}}{\text{Vehicle speed}} \quad \text{[Equation 2]}$$

In the instant case, the default speed is set to 50 km/h corresponding to the speed limit in the city center recommended as a suitable speed criterion and a social required speed of the general road by state agencies, but it is obvious that such a value of a default speed may be differently set.

When the current vehicle speed is faster than the default speed, because there is an increase in degree where the default dimming period is shortened as much as a quick degree, when the default speed is 50 km/h and when the current vehicle speed is 100 km/h, as shown in Table 1 below, the variable dimming period may be determined as half the default dimming period, thus more rapidly reaching the target screen brightness. Table 1 below illustrates an example of determining a variable dimming period determined when the vehicle speed is from 10 km/h to 100 km/h and when the default speed is 50 km/h.

When the vehicle speed is less than or equal to the default speed, as shown in Table 1 below, the variable dimming period may be maintained to be the same as the default dimming period to prevent the dimming period from being too long.

Furthermore, when a total dimming time taken for screen brightness to change from the current screen brightness to the target screen brightness is too long, the user may recognize a sense of difference due to a change in screen brightness, and this may not avoid falling visibility of content displayed on the AVN system upon a rapid change in illumination environment. Thus, a total dimming time may be set not to be greater than a maximum dimming time which is a range where the user does not feel a sense of difference. It is obvious that it is possible to change the maximum dimming time by tuning or the like.

Accordingly, a minimum dimming period a where the total dimming time is maintained not to be greater than the maximum dimming time (set to 10 seconds in the exemplary embodiment) may be set like Equation 3 below. The dimming period varying device 434 may set such that the variable dimming period is maintained to be greater than or equal to the minimum dimming period when the vehicle speed is slower than the predetermined default speed.

$$\text{Minimum dimming period} = \text{Maximum dimming time} \times \frac{\text{Vehicle dimming ratio}}{\text{Brightness change degree changed by dimming control}} \quad \text{[Equation 3]}$$

The dimming period varying device 434 may set the default dimming period to be maintained when the vehicle speed is slower than the default speed and when the default dimming period is greater than the minimum dimming period and may set the minimum dimming period to the variable dimming period when the default dimming period is less than the minimum dimming period.

Furthermore, the dimming ratio varying device 436 may increase or decrease the default dimming ratio to determine the variable dimming ratio, based on the ratio of the vehicle speed to the default speed like Equation 4 below.

$$\text{Variable dimming ratio} = \text{Default dimming ratio} \times \frac{\text{Vehicle speed}}{\text{Default speed}} \quad \text{[Equation 4]}$$

Accordingly, the variable dimming ratio determined based on the current vehicle speed by the dimming ratio varying device 436 is shown in Table 1 below.

TABLE 1

| Speed(km/h) | Variable dimming ratio (%) | Variable dimming period (ms) |
|---|---|---|
| 10 | Variable dimming ratio * 0.2 | α |
| 20 | Variable dimming ratio * 0.4 | α |
| 30 | Variable dimming ratio * 0.6 | Variable dimming period |
| 40 | Variable dimming ratio * 0.8 | Variable dimming period |
| 50 | Variable dimming ratio * 1.0 | Variable dimming period * 1.0 |
| 60 | Variable dimming ratio * 1.2 | Variable dimming period * 0.833 |
| 70 | Variable dimming ratio * 1.4 | Variable dimming period * 0714 |
| 80 | Variable dimming ratio * 1.6 | Variable dimming period * 0.625 |
| 90 | Variable dimming ratio * 1.8 | Variable dimming period * 0.555 |
| 100 | Variable dimming ratio * 2.0 | Variable dimming period * 0.5 |
| . . . | . . . | . . . |

Because the faster the vehicle speed, the faster the illumination change is generated, the dimming varying device 430 may decrease the dimming period and may increase the dimming ratio such that a change to screen brightness suitable for a rapid illumination change performed in a short time is rapidly performed.

Furthermore, because the slower the vehicle speed, the slower the illumination change is generated, the dimming varying device 430 may increase the dimming period and may decrease the dimming ratio such that a change in screen brightness suitable for an illumination change performed during a relatively long time is performed.

Figure 7:
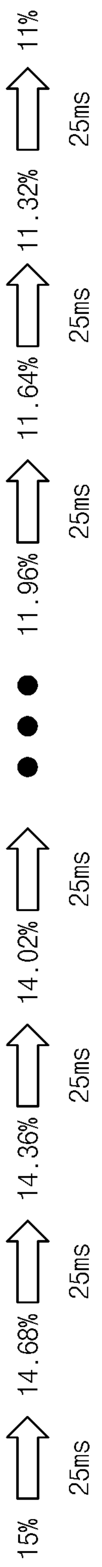
FIG. 7, FIG. 8, and FIG. 9 are drawings illustrating a dimming process where a dimming ratio and a dimming period are variably applied according to a driving speed of a vehicle according to various exemplary embodiments of the present invention.
Figure 8:
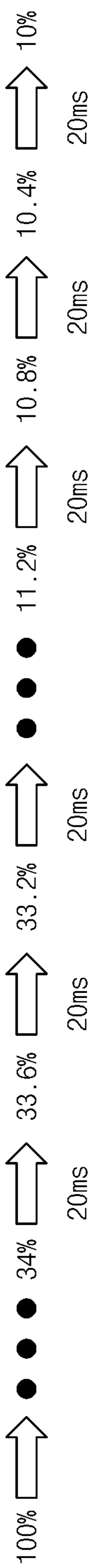
Figure 9:
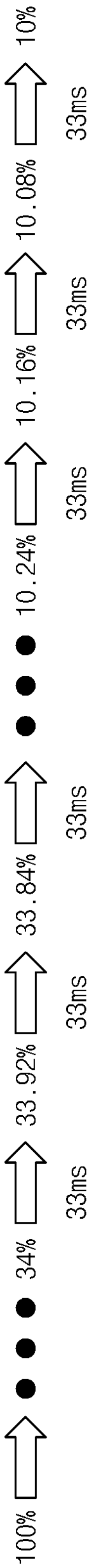

Hereinafter, referring to FIGS. 7 to 9, a description will be provided of some examples of changing screen brightness in a variable dimming period and at a variable dimming ratio, which are changed according to a vehicle speed. FIG. 7, FIG. 8 and FIG. 9 are drawings illustrating a dimming process where a dimming ratio and a dimming period are variably applied according to a driving speed of a vehicle according to various exemplary embodiments of the present invention.

First of all, FIG. 7 illustrates a screen brightness of a display provided in an AVN system of a vehicle traveling at 80 km/h on a highway in the evening when the sun goes down and the illumination is dark is changed by a change in illumination environment by a street lamp, a tail lamp of a surrounding vehicle, head lamps of a vehicle in the opposite lane, light from an electric sign, or the like.

Because the vehicle is traveling in the evening when the sun goes down and the illumination is dark, it is assumed that illumination around the vehicle is dark below 400 Lux and that screen brightness changes from 15% to 11% by an average of illumination data transmitted from the illumination sensor.

In the instant case, because the default dimming period is 40 ms, the default dimming ratio is 0.2%, and the vehicle is traveling at 80 km/h, the dimming varying device 430 may determine the variable dimming period as 25 ms and may determine the variable dimming ratio as 032%, as shown in Table 1 above by Equations 2 and 4 above.

Thus, as shown in FIG. 7, screen brightness decreases from 15% to 14.68% after 25 ms from the present by 0.32% and decreases to 14.36% after 25 ms elapses to decrease to the target screen brightness of 11% on a stage-by-stage basis.

When screen brightness is changed by the default dimming period and the default dimming ratio to reach the target screen brightness, it takes about 0.8 seconds while repeating a change process about 20 times. However, because only about 13 change processes are performed when screen brightness is changed by the variable dimming period and the variable dimming ratio changed based on the vehicle speed, it may take only about 0.325 seconds.

Accordingly, when the vehicle speed is faster than the default speed in the dark environment, the dimming varying device 430 may decrease the dimming period and may increase the dimming ratio such that a change in screen brightness corresponding to a rapid illumination change is rapidly performed.

Furthermore, FIG. 8 illustrates that screen brightness is changed when a vehicle driving at 100 km/h on a bright sunny day enters the underground tunnel. Accordingly, when the vehicle traveling enters the underground tunnel or the like, an illumination environment around the vehicle is rapidly changed from about 20,000 Lux to about 10 Lux within 1 second.

In the instant case, because the default dimming period is 40 ms, the default dimming ratio is 0.2%, and the vehicle is traveling at 100 km/h, the dimming varying device 430 may determine the variable dimming period as 20 ms and may determine the variable dimming ratio as 0.4%, as shown in Table 1 above. Thereafter, as shown in FIG. 8, screen brightness decreases at intervals of 20 ms by 0.4% and reaches the target screen brightness of 10%.

Thus, when screen brightness is changed by the default dimming period and the default dimming ratio to reach the target screen brightness, it takes about 4.8 seconds. However, when screen brightness is changed by the variable dimming period and the variable dimming ratio changed based on the vehicle speed, it may take only about 1.2 seconds.

Because the dimming control by the dimming control module 400 is applicable under the low illumination environment, as shown on the default graph shown in FIG. 5, a decrease by 0.4% at intervals of 20 ms from the point where screen brightness is about 34% is performed. In FIG. 8, it is shown that screen brightness decreases by 0.4% at intervals of 20 ms from 34% to decrease to 33.6%, 33.2%, or the like.

Accordingly, screen brightness is changed by the variable dimming period and the variable dimming ratio changed based on the vehicle speed such that a quick change in screen brightness may be performed upon a rapid illumination change, to rapidly ensure visibility of visual content provided through a display of an AVN system.

Furthermore, FIG. 9 illustrates that screen brightness is changed when a vehicle enters an underground parking lot on a bright sunny day. Accordingly, when the vehicle enters the underground parking lot, an illumination environment around the vehicle is rapidly changed from about 20,000 Lux to about 10 Lux within 1 second. Herein, there is a difference with the example shown in FIG. 8 in that the vehicle speed decreases to 20 km/h when the vehicle enters the underground parking lot.

In the instant case, because the default dimming period is 40 ms, the default dimming ratio is 0.2%, and the vehicle is traveling at 20 km/h, the dimming varying device 430 may determine the variable dimming period as the minimum dimming period a and may determine the variable dimming ratio as 0.08%, as shown in Table 1 above.

The minimum dimming period a may be determined as 33 ms because $\alpha=10*(0.08/24)$ by Equation 3 above. In the instant case, the 'variable dimming ratio' applied in Equation 3 above becomes 0.08% determined based on the current vehicle speed. As described above in the description of FIG. 8, as screen brightness decreases to about 10% matched to current illumination data (about 10 Lux) from a point of about 34% (i.e., a low illumination environment of the point of 400 Lux), 'the brightness change degree changed by the dimming control' applied to Equation 3 above' becomes about 24%.

Thus, as shown in FIG. 9, when screen brightness is changed by the default dimming period and the default dimming ratio to reach the target screen brightness, it may take about 4.8 seconds. However, when screen brightness is changed by the variable dimming period and the variable dimming ratio changed based on the vehicle speed, it may take only about 9.9 seconds.

Figure 10:
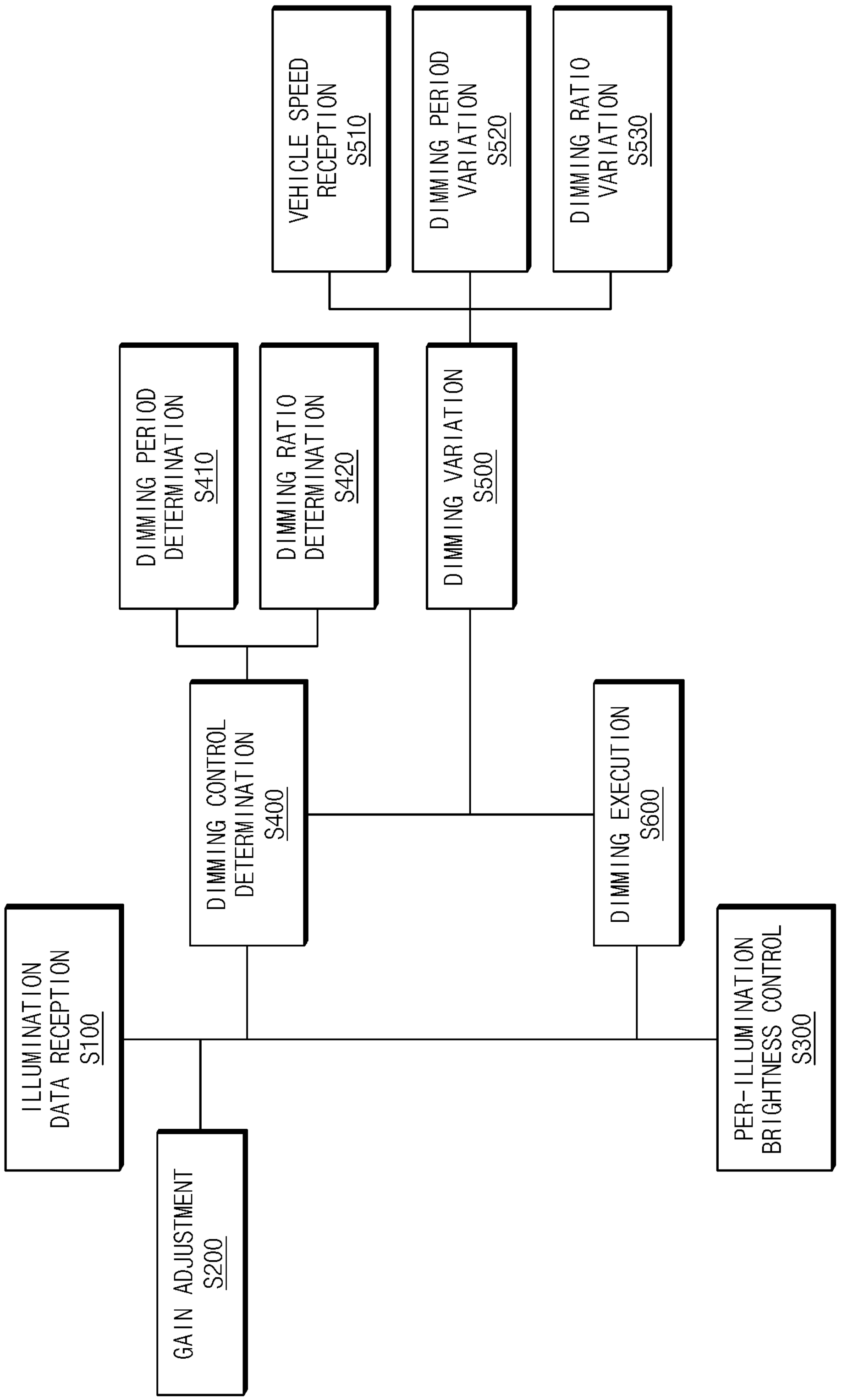
FIG. 10 is a drawing illustrating a method for automatically controlling a screen brightness of an AVN system according to various exemplary embodiments of the present invention.

Next, a description will be provided of a method for automatically controlling a screen brightness of an AVN system according to various exemplary embodiments of the present invention with reference to FIG. 10.

FIG. 10 is a drawing illustrating a method for automatically controlling a screen brightness of an AVN system according to various exemplary embodiments of the present invention.

Referring to FIG. 10, the method for automatically controlling the screen brightness of the AVN system according to various exemplary embodiments of the present invention may include receiving (S100) at least one illumination data measured per certain period by an illumination sensor, controlling (S300) to automatically change a screen brightness of a display provided in the AVN system depending on a change in the illumination data received by the illumination sensor based on a default matching relationship between the illumination data and screen brightness, and generating (S200) a new customized matching relationship by correcting screen brightness matched to each illumination data based on the default matching relationship by an input of a user who adjusts to enhance or weaken screen brightness and providing the new customized matching relationship for screen brightness control.

S100 may be to receive illumination data transmitted per certain period from the illumination sensor and determine an average of a certain number of received illumination data to recognize an illumination change of an environment outside the vehicle which traveling.

In other words, S100 may be to compare an average of illumination data recently determined with an average of illumination data previously determined to recognize whether there is a change in illumination data for determining whether to change screen brightness.

Furthermore, S300 may be to find a value corresponding to the illumination data determined in S100 from an illumination-brightness table which stores the default matching relationship between the illumination data and the screen brightness, determine screen brightness matched to the illumination data as target screen brightness which should be applied to the display of the AVN system in a current illumination environment, and control such that the brightness is implemented.

S300 may be to determine the target screen brightness which should be applied to the display of the AVN system depending on the change in illumination data using the default matching relationship.

However, as a screen brightness degree the user wants may vary under the same illumination data, S200 may be to set a change degree of screen brightness changed according to illumination data in a customized manner each user wants.

To the present end, S200 may be to receive an input of the user who adjusts to enhance or weaken screen brightness matched and implemented to current illumination data to be brighter or darker and reflect a user adjustment gain, which is a change degree of screen brightness by the input of the user, in screen brightness on the default matching relationship to generate a customized matching relationship of performing matching between illumination data and new screen brightness.

In other words, S200 may be to determine a ratio of the screen brightness corrected by the input of the user to screen brightness on the default matching relationship matched to current illumination as the user adjustment gain.

S200 may be to multiply screen brightness matched to each illumination data on the default matching relationship by new screen brightness to determine new screen brightness and generate a customized matching relationship by matching the new screen brightness to each illumination data.

Accordingly, when the customized matching relationship is generated in S200, S300 may be to determine target screen brightness depending on the customized matching relationship rather than the default matching relationship, when changing a screen brightness of the display provided in the AVN system depending on a change in illumination data, and perform control for the change in screen brightness.

Furthermore, the method for automatically controlling the screen brightness of the AVN system according to various exemplary embodiments of the present invention may further include controlling (S600) such that screen brightness is changed on a stage-by-stage basis by a certain ratio per certain period, in automatically changing the screen brightness degree depending on the change in illumination data using the default matching relationship or the customized matching relationship in S300. S600 may be mainly applied in a low illumination environment where illumination data is less than or equal to 400 Lux, that is, when screen brightness is less than or equal to 34% on the default matching relationship.

The method for automatically controlling the screen brightness of the AVN system according to various exemplary embodiments of the present invention may further include determining (S400) a dimming period or a dimming ratio of screen brightness which should be changed on a stage-by-stage basis until reaching target screen brightness on the default matching relationship or the customized matching relationship to be implemented by current illumination data, for dimming control of screen brightness.

S400 may include determining (S410) a default dimming period for changing screen brightness on a stage-by-stage basis from current screen brightness to the target screen brightness and determining (S420) a default dimming ratio which is a change degree of screen brightness to be changed for each dimming period.

Because the change in screen brightness by dimming control naturally proceeds within a range where the user does not feed a visual sense of difference, S410 may be to determine the default dimming period and the default dimming ratio within a range where there is a low probability that the user will recognize a change in screen brightness.

Thus, the exemplary embodiment is exemplified as the default dimming period when the screen brightness is changed is set to 0.04 seconds and as the default dimming ratio where the screen brightness is changed in each default dimming period is set to 0.2%, but not limited to such specific values. The default dimming period and the default dimming ratio may be determined as various values capable of naturally changing screen brightness within a range where the user does not feel a visual sense of difference.

Furthermore, the method for automatically controlling the screen brightness of the AVN system according to various exemplary embodiments of the present invention may further include determining (S500) a variable dimming period and a variable dimming ratio by changing the default dimming period and the default dimming ratio based on a driving speed of the vehicle such that a rapid change in screen brightness is performed when the driving speed of the vehicle is quick and applying the variable dimming period and the variable dimming ratio to dimming control.

To the present end, S500 may include obtaining (S510) a speed of the vehicle which is traveling, determining (S520) a variable dimming period by shortening the default dimming period based on the vehicle speed, when the vehicle speed is faster than the default speed, and determining (S530) a variable dimming ratio by changing the default dimming ratio based on a ratio of the vehicle speed to the predetermined default speed.

S510 may be to receive a vehicle speed from various measurement means including a wheel speed sensor provided in the vehicle.

Furthermore, S520 may be to compare the vehicle speed with the predetermined default speed and multiply the default dimming period by a ratio of the predetermined default speed to the vehicle speed to determine a variable dimming period, when the vehicle speed is faster than the predetermined default speed.

The exemplary embodiment is exemplified as the default speed is set to 50 km/h to determine the variable dimming period, but not limited to such a specific value. It is obvious that the value of the default speed may be differently set.

In the instant case, S520 may be to set the variable dimming period to be the same as the default dimming period, when the vehicle speed is less than or equal to the predetermined default speed. Furthermore, S520 may be to set such that the variable dimming period is kept greater than or equal to a minimum dimming period set such that a total dimming time is not greater than a maximum dimming time.

Furthermore, S530 may be to increase or decrease the default dimming ratio to determine the variable dimming ratio, based on a ratio of the vehicle speed to the predetermined default speed.

Thus, because the faster the vehicle speed, the faster the illumination change is generated, S520 may be to decrease the dimming period and S530 may be to increase the dimming ratio such that a change to screen brightness suitable for a rapid illumination change performed in a short time may be rapidly performed.

Accordingly, of the present invention an exemplary embodiment of the present invention may automatically change a screen brightness of the display of the AVN system to an optimal state incapable of interfering with visibility of the user, depending on a rapid change in illumination environment outside the vehicle which is traveling such that the user may focus on driving, to reduce the risk of an accident.

Furthermore, of the present invention an exemplary embodiment of the present invention may automatically control screen brightness to an optimal state depending on a change in illumination environment outside the vehicle, thus reducing that passengers in the vehicle, including the user, experience glare when seeing the display screen of the AVN system, when screen brightness changes to a dark illumination environment in a state where it is kept very bright to ensure visibility.

Thus, of the present invention an exemplary embodiment of the present invention may enhance visibility of the user and the passenger of the vehicle for visual content displayed on the display of the AVN system depending on a change in illumination environment and screen brightness automatically controlled to suit a speed of the vehicle which is traveling.

Embodiments of the present invention may automatically change screen brightness in a user customized manner in a response to a rapid change in illumination environment the vehicle traveling experiences, thus improving visibility of visual content.

Furthermore, embodiments of the present invention may automatically change screen brightness to an optimal state depending on a change in external illumination environment, thus reducing glare passengers in the vehicle, including the driver, experience when seeing the display screen of the AVN system, because there is no need to maintain screen brightness to be too bright to ensure visibility.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for automatically controlling a screen brightness of an audio video navigation (AVN) system, the apparatus comprising:

an illumination sensor configured to measure illumination outside a vehicle per a predetermined period;

an illumination data receiving device configured to receive illumination data transmitted per the predetermined period from the illumination sensor and determine an average of a predetermined number of the received illumination data;

a per-illumination brightness controller configured to determine target screen brightness matched to the average of the illumination data, the average being determined by the illumination data receiving device, from a previously stored default matching relationship; and a display configured to control a screen brightness based on the target screen brightness, and wherein the per-illumination brightness controller is configured to determine the target screen brightness based on a new customized matching relationship which is generated by correcting the screen brightness matched to each illumination data based on the default matching relationship in accordance with an input of a user who adjusts to enhance or weaken the screen brightness.

2. The apparatus of claim 1, wherein the display is configured to control a screen brightness according to an user adjustment gain which is obtained based on a screen brightness corrected by the input of the user and the screen brightness on the default matching relationship.

3. The apparatus of claim 2, wherein the display is configured to control a screen brightness according to a new customized graph illustrating a customized matching relationship re-generated by adjustment of the user which is obtained by multiplying screen brightness on a default graph illustrating the default matching relationship between the illumination data and the screen brightness and the user adjustment gain.

4. The apparatus of claim 1, further including:

a dimming adjusting device configured to determine a dimming period and a dimming ratio of screen brightness which should change on a stage-by-stage basis until reaching the target screen brightness to be implemented from current illumination data; and a dimming executing device configured to control to change current screen brightness by a predetermined dimming ratio per the dimming period.

5. The apparatus of claim 4, wherein the dimming adjusting device includes:

a dimming period determining device configured to determine a default dimming period for changing the screen brightness from the current screen brightness to the target screen brightness; and a dimming ratio determining device configured to determine a default dimming ratio which is a change degree of screen brightness to be changed for each default dimming period.

6. The apparatus of claim 5, further including a dimming varying device configured to:

determine a variable dimming period and a variable dimming ratio by changing the default dimming period and the default dimming ratio based on a driving speed of the vehicle; and execute dimming control based on the variable dimming period and the variable dimming ratio.

7. The apparatus of claim 6, wherein the dimming varying device includes:

a vehicle speed receiving device configured to obtain a vehicle speed of the vehicle which is traveling;

a dimming period varying device configured to determine the variable dimming period by shortening the default dimming period based on the vehicle speed, when the vehicle speed is faster than a predetermined default speed; and a dimming ratio varying device configured to determine the variable dimming ratio by changing the default dimming ratio based on a ratio of the vehicle speed to the predetermined default speed.

8. The apparatus of claim 7, wherein the dimming period varying device is configured to multiply the default dimming period by a ratio of the predetermined default speed to the vehicle speed to determine the variable dimming period by shortening the default dimming period, when the vehicle speed is faster than the predetermined default speed.

9. The apparatus of claim 7, wherein the dimming ratio varying device is configured to multiply the default dimming period by the ratio of the vehicle speed to the default speed to determine the variable dimming period by increasing or decreasing the default dimming period.

10. A method for automatically controlling a screen brightness of an audio video navigation (AVN) system, the method comprising:

receiving at least one illumination data measured per a predetermined period by an illumination sensor;

controlling so that a screen brightness of a display provided in the AVN system is automatically changed according to a change in the illumination data received from the illumination sensor, based on a default matching relationship between the illumination data and the screen brightness;

generating a new customized matching relationship by correcting the screen brightness matched to each illumination data based on the default matching relationship in accordance with an input of a user who adjusts to enhance or weaken the screen brightness and providing the new customized matching relationship for screen brightness control; and performing dimming control so that screen brightness is changed on a stage-by-stage basis by a predetermined ratio per a predetermined period, in automatically changing a screen brightness degree depending on the change in the illumination data using the default matching relationship or a customized matching relationship.

11. The method of claim 10, wherein the controlling includes:

finding a value corresponding to illumination data from an illumination-brightness table which stores the default matching relationship between the illumination data and the screen brightness;

determining screen brightness matched to the illumination data as target screen brightness in a current illumination environment; and controlling so that the screen brightness is implemented.

12. The method of claim 10, wherein the providing of the new customized matching relationship includes:

determining a ratio of the screen brightness corrected by the input of the user to screen brightness on the default matching relationship, the screen brightness being matched to current illumination data, as a user adjustment gain which is a screen brightness change degree the user requires to correct;

multiplying the screen brightness on the default matching relationship by the user adjustment gain to determine new screen brightness; and generating a customized matching relationship by matching the new screen brightness to each illumination data.

13. The method of claim 10, further including:

determining a dimming period and a dimming ratio of screen brightness which changes on a stage-by-stage basis until reaching target screen brightness on the default matching relationship or the customized matching relationship to be implemented by current illumination data, before performing the dimming control.

14. The method of claim 13, wherein the determining of the dimming period and the dimming ratio includes:

determining a default dimming period for changing the screen brightness on a stage-by-stage basis from current screen brightness to the target screen brightness; and determining a default dimming ratio which is a change degree of screen brightness to be changed for each default dimming period.

15. The method of claim 14, further including:

determining a variable dimming period and a variable dimming ratio by changing the default dimming period and the default dimming ratio based on a driving speed of a vehicle; and providing the variable dimming period and the variable dimming ratio for the dimming control.

16. The method of claim 15, wherein the providing of the variable dimming period and the variable dimming ratio includes:

obtaining a vehicle speed of the vehicle which is traveling;

determining the variable dimming period by shortening the default dimming period based on the vehicle speed, when the vehicle speed is faster than a predetermined default speed; and determining the variable dimming ratio by changing the default dimming ratio based on a ratio of the vehicle speed to the predetermined default speed.

17. The method of claim 16, wherein the determining of the variable dimming period includes:

multiplying the default dimming period by a ratio of the predetermined default speed to the vehicle speed to determine the variable dimming period by shortening the default dimming period, when the vehicle speed is faster than the predetermined default speed.

* * * * *